United States Patent
Yamaguchi

(10) Patent No.: US 11,041,715 B2
(45) Date of Patent: Jun. 22, 2021

(54) OPTICAL MEASUREMENT APPARATUS, MEASUREMENT METHOD, PROGRAM, AND RECORDING MEDIUM

(71) Applicant: PIONEER CORPORATION, Tokyo (JP)

(72) Inventor: Atsushi Yamaguchi, Kawagoe (JP)

(73) Assignee: PIONEER CORPORATION, Tokyo (JP)

(*) Notice: Subject to any disclaimer, the term of this patent is extended or adjusted under 35 U.S.C. 154(b) by 0 days.

(21) Appl. No.: 16/643,491

(22) PCT Filed: Aug. 22, 2018

(86) PCT No.: PCT/JP2018/030912
§ 371 (c)(1),
(2) Date: Feb. 28, 2020

(87) PCT Pub. No.: WO2019/044600
PCT Pub. Date: Mar. 7, 2019

(65) Prior Publication Data
US 2020/0191562 A1    Jun. 18, 2020

(30) Foreign Application Priority Data
Aug. 31, 2017    (JP) .............................. JP2017-167268

(51) Int. Cl.
*G01B 11/24*    (2006.01)
*G01N 21/3586*    (2014.01)

(52) U.S. Cl.
CPC ......... *G01B 11/24* (2013.01); *G01N 21/3586* (2013.01)

(58) Field of Classification Search
CPC ........... G01N 21/3586; G01N 21/3581; G01N 21/3563; G01N 2291/2697;
(Continued)

(56) References Cited

U.S. PATENT DOCUMENTS

2007/0257216 A1    11/2007    Withers et al.
2010/0148069 A1    6/2010    Ouchi
(Continued)

FOREIGN PATENT DOCUMENTS

EP    2157420 A    2/2010
JP    2008151618 A    7/2008
(Continued)

OTHER PUBLICATIONS

International Search Report for related JP App. No. PCT/JP2018/030912 dated Aug. 22, 2018; 3 pages.
(Continued)

*Primary Examiner* — Michael P Stafira
(74) *Attorney, Agent, or Firm* — Procopio, Cory, Hargreaves & Savitch LLP

(57) ABSTRACT

An irradiation unit configured to scan and irradiate a sample with pulse waves; a reception unit configured to receive reflected waves of the pulse waves from the sample; a waveform generation unit configured to generate time waveforms of a signal representing the reflected waves at respective scan positions of the pulse waves; and a waveform correction unit configured to detect at least one peak in each of the time waveforms, and correct each of the time waveforms on a basis of each of positions of the at least one peak in the time waveforms are included.

6 Claims, 5 Drawing Sheets

(58) Field of Classification Search
CPC ....... G01N 2021/1787; G01N 21/4795; G01N 27/44721; G01N 27/44769; G01N 29/043; G01N 29/14; G01N 29/225; G01N 29/265; G01N 29/27; G01N 29/28; G01N 29/4436; G01N 33/5308; G01N 19/08; G01N 2021/0339; G01N 2021/1782; G01N 2021/558; G01N 2021/6417; G01N 2021/6439; G01N 2021/6441; G01N 2021/8438; G01N 2021/9513; G01N 21/0303; G01N 21/255; G01N 21/31; G01N 21/3577; G01N 21/55; G01N 21/59; G01N 21/6428; G01N 21/6456; G01N 21/7703; G01N 21/8422; G01N 21/85; G01N 21/94; G01N 2201/0225; G01N 2201/023; G01N 2201/06113; G01N 2201/101; G01N 2291/015; G01N 2291/0258; G01N 2291/044; G01N 2291/106; G01N 27/20; G01N 27/447; G01N 27/44726; G01N 27/44791; G01N 29/04; G01N 29/041; G01N 29/11; G01N 29/22; G01N 29/228; G01N 29/245; G01N 29/343; G01N 29/348; G01N 29/44; G01N 29/4427; G01N 29/4454; G01N 29/4472; G01N 30/8606; G01N 30/8631; G01N 30/8644; G01N 33/4915; G01N 33/492; G01N 33/721; G01B 9/02091; G01B 9/02004; G01B 11/06; G01B 11/0641; G01B 11/14; G01B 11/24; G01B 17/00; G01B 9/02001; G01B 9/02002; G01B 9/02015; G01J 3/42; G01J 5/10; G01J 3/2823; G01J 5/08; G01J 5/0896; G02B 17/0621; G02B 6/0001; G02B 6/10; G02B 6/241
See application file for complete search history.

(56) References Cited

U.S. PATENT DOCUMENTS

| | | | | |
|---|---|---|---|---|
| 2010/0305774 | A1* | 12/2010 | Miller | G06Q 40/04 700/297 |
| 2010/0308223 | A1* | 12/2010 | Itsuji | G01J 3/42 250/340 |
| 2012/0223229 | A1 | 9/2012 | Itsuji | |
| 2012/0318967 | A1 | 12/2012 | Itsuji | |
| 2013/0218008 | A1* | 8/2013 | Itsuji | A61B 5/0507 600/425 |
| 2014/0209802 | A1 | 7/2014 | Itsuji | |
| 2015/0008324 | A1 | 1/2015 | Itsuji | |

FOREIGN PATENT DOCUMENTS

| | | |
|---|---|---|
| JP | 2011191128 A | 9/2011 |
| JP | 2012185012 A | 9/2012 |
| JP | 2013088375 A | 5/2013 |
| JP | 2013170899 A | 9/2013 |
| JP | 2014194344 A | 10/2014 |
| JP | 2014222157 A | 11/2014 |
| JP | 2016035394 A | 3/2016 |
| JP | 2016114371 A | 6/2016 |
| JP | 2016186424 A | 10/2016 |
| JP | 2017020837 A | 1/2017 |
| JP | 2017026358 A | 2/2017 |
| WO | 2006085403 A | 8/2006 |

OTHER PUBLICATIONS

Notice of Rejection from the JPO in the counterpart JP Patent Application No. 2019539400, dated Oct. 6, 2020, Total 7 pages.
Masahide Inuzuka,"Use of Video Information Media in Different Industries" Journal of Video Information Media Society, Japan,The Institute of Image Information and Television Engineers, 2017, vol. 71, No. 2, pp. 235-239.
Extended European Search Report dated Mar. 12, 2021 in EP Application No. 18851830.2, 7 pages.

* cited by examiner

OPTICAL MEASUREMENT APPARATUS, MEASUREMENT METHOD, PROGRAM, AND RECORDING MEDIUM

CROSS-REFERENCE TO RELATED APPLICATIONS

This application is a U.S. National Stage entry of PCT Application No. PCT/JP2018/030912, filed on Aug. 22, 2018, which claims priority to JP Application No. 2017-167268, filed Aug. 31, 2017. The contents of the foregoing are incorporated by reference.

TECHNICAL FIELD

The present invention relates to an optical measurement apparatus for measuring and analyzing a characteristic of a sample by irradiating the sample with electromagnetic waves, as well as a measurement method, a program, and a recording medium.

BACKGROUND ART

A technique for irradiating a sample with terahertz waves that are electromagnetic waves in a frequency band between radio waves and infrared rays (for example, 0.1 to 10 THz) and measuring reflected waves or transmitted waves from the sample by time-domain spectroscopy has heretofore been known. For example, an internal configuration and the like of the sample can thereby be inspected without destruction of the sample. For example, Patent Literature 1 discloses a measurement apparatus including a generation unit of terahertz wave pulses and a detection unit of terahertz wave pulses from a measuring object.

CITATION LIST

Patent Literature

Patent Literature 1: Japanese Patent Application Laid-Open No. 2017-026358

SUMMARY OF INVENTION

Technical Problem

An optical measurement apparatus can inspect a cross-sectional structure of a sample, for example, by scanning and irradiating the sample with pulsed electromagnetic waves and measuring electromagnetic waves (reflected waves) reflected from the sample at respective scan positions of the electromagnetic waves by a time-of-flight method. For example, the optical measurement apparatus generates time waveforms of a detection signal representing the reflected waves from the sample at the respective scan positions, and generates a tomographic image of the sample on the basis of peaks (pulse positions) in the time waveforms.

If, for example, the sample includes a plurality of layers of materials, the reflected waves from the sample include reflected waves from the surface of the sample and reflected waves from the interfaces between the layers in the sample. The reflected waves from the sample have respective different optical lengths (optical distances) from irradiation of the sample to arrival at a light reception unit of the apparatus. The peaks in the time waveforms can thus be located at positions different from those corresponding to the actual interfaces between the layers.

In such a case, an accurate tomographic image can be unobtainable. For example, if the actual sample has a flat interface, the flat interface can be displayed in a curved shape or as an uneven surface in the tomographic image. This can interfere with accurate comprehension of the cross-sectional structure of the sample.

The present invention has been achieved in view of the foregoing, and an object thereof is to provide an optical measurement apparatus capable of performing appropriate processing on time waveforms of electromagnetic waves from a sample at respective scan positions to accurately and clearly find out a cross-sectional structure of the sample, as well as a measurement method, a program, and a recording medium.

Solution to Problem

The invention set forth in claim 1 is characterized by including: an irradiation unit configured to scan and irradiate a sample with pulse waves; a reception unit configured to receive reflected waves of the pulse waves from the sample; a waveform generation unit configured to generate time waveforms of a signal representing the reflected waves at respective scan positions of the pulse waves; and a waveform correction unit configured to detect at least one peak in each of the time waveforms, and correct each of the time waveforms on the basis of each of positions of the at least one peak in the time waveforms.

The invention set forth in claim 5 is characterized by including the steps of: scanning and irradiating a sample with pulse waves; receiving reflected waves of the pulse waves from the sample; generating time waveforms of a signal representing the reflected waves at respective scan positions of the pulse waves; and detecting at least one peak in each of the time waveforms, and correcting each of the time waveforms on the basis of each of positions of the at least one peak in the time waveforms.

The invention set forth in claim 6 is characterized by causing an optical measurement apparatus to operate as: an irradiation unit configured to scan and irradiate a sample with pulse waves; a reception unit configured to receive reflected waves of the pulse waves from the sample; a waveform generation unit configured to generate time waveforms of a signal representing the reflected waves at respective scan positions of the pulse waves; and a waveform correction unit configured to detect at least one peak in each of the time waveforms, and correct each of the time waveforms or, the basis of each of positions of the at least one peak in the time waveforms.

The invention set forth in claim 7 is characterized in that on which is recorded a program for causing an optical measurement apparatus to operate as: an irradiation unit configured to scan and irradiate a sample with pulse waves; a reception unit configured to receive reflected waves of the pulse waves from the sample; a waveform generation unit configured to generate time waveforms of a signal representing the reflected waves at respective scan positions of the pulse waves; and a waveform correction unit configured to detect at least one peak in each of the time waveforms, and correct each of the time waveforms on the basis of each of positions of the at least one peak in the time waveforms.

DESCRIPTION OF EMBODIMENTS

An embodiment of the present invention will be described in detail below.

First Embodiment

Figure 1:
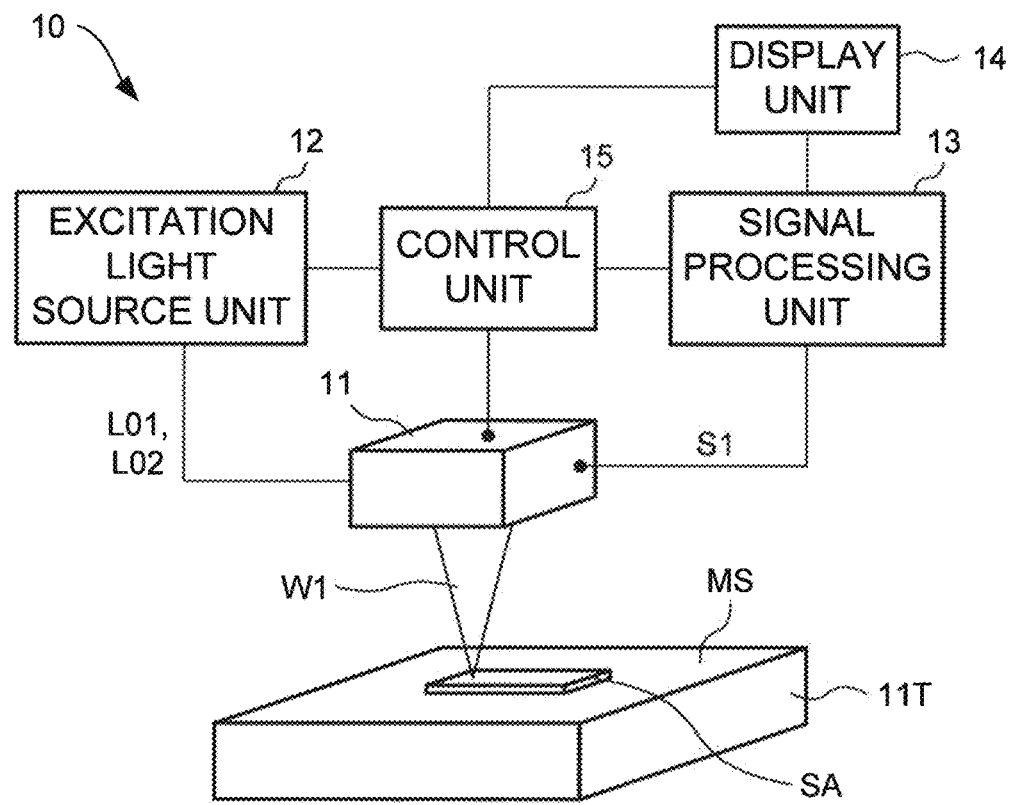
FIG. 1 is a perspective view of an optical measurement apparatus according to a first embodiment.
Figure 2:
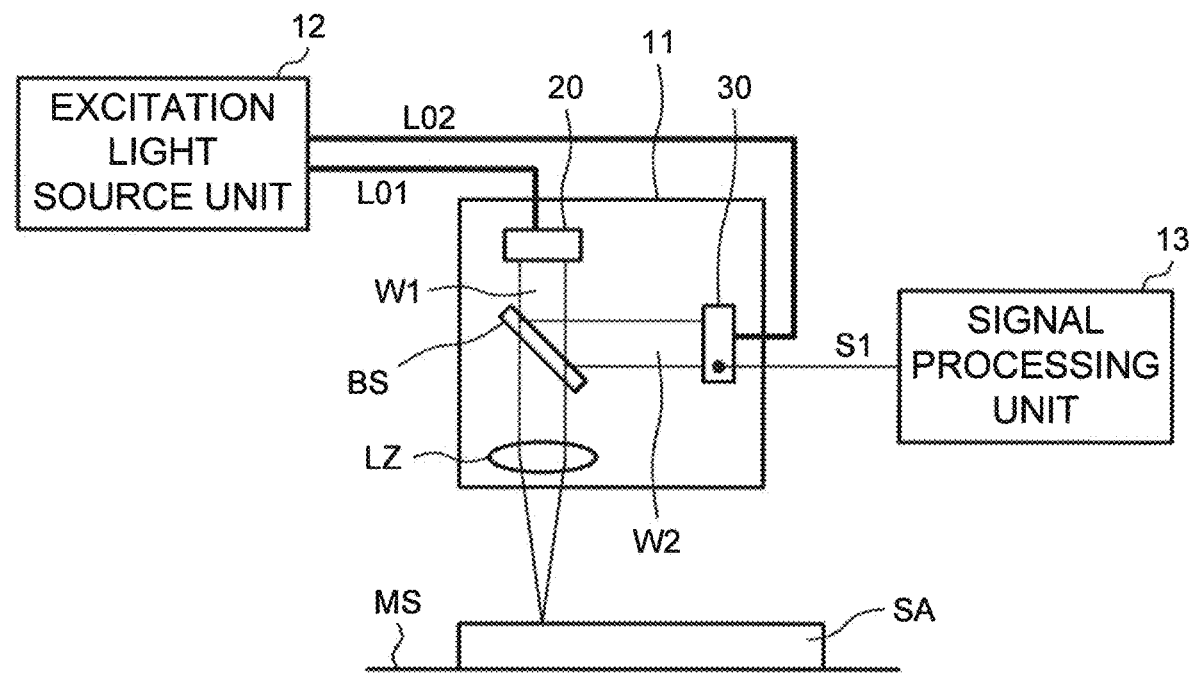
FIG. 2 is a diagram illustrating a configuration of a scan head in the optical measurement apparatus according to the first embodiment.

FIG. 1 is a diagram schematically illustrating a configuration of an optical measurement apparatus 10 according to a first embodiment. FIG. 2 is a diagram schematically illustrating a configuration of a scan head 11 in the optical measurement apparatus 10. The overall configuration of the optical measurement apparatus 10 will be described with reference to FIGS. 1 and 2.

Initially, as illustrated in FIG. 1, the optical measurement apparatus 10 includes the scan head 11 that scans and irradiates a sample SA with pulsed electromagnetic waves (may be referred to as pulse waves or scan waves) W1. The scan head 11 functions as an irradiation unit of the pulse waves W1. The scan head 11 also functions as a reception unit that receives reflected waves W2 of the pulse waves W1 from the sample SA.

In the present embodiment, the optical measurement apparatus 10 is a measurement apparatus that irradiates the sample (object to be measured) SA with terahertz waves as the pulse waves W1 and measures the terahertz waves reflected from the sample SA by time-domain spectroscopy. As employed herein, terahertz waves refer to electromagnetic waves in a frequency band between radio waves and infrared rays (for example, 0.1 to 10 THz).

In the present embodiment, the optical measurement apparatus 10 includes a mounting table 11T having a mounting surface MS for the sample SA. The scan head 11 includes an opposed surface which is opposed to the mounting surface MS of the mounting table 11T. An opening (not illustrated) serving as an emitting portion of the pulse waves W1 and an incident portion (light receiving portion) of the reflected waves W2 is formed in the opposed surface.

The scan head 11 also includes a moving mechanism (not illustrated) that moves the emitting portion of the pulse waves W1 in an in-plane direction of the mounting surface MS (direction parallel to the mounting surface MS). The area (irradiated point) to be irradiated with the pulse waves W1 on the mounting surface MS is moved by the moving mechanism, whereby the pulse waves W1 are scanned over the sample SA.

In the present embodiment, the optical measurement apparatus 10 includes an electromagnetic wave generation element and an electromagnetic wave detection element in the scan head 11. The optical measurement apparatus 10 includes an excitation light source unit 12 that generates excitation light L01 and L02 for exciting the electromagnetic wave generation element and the electromagnetic wave detection element, respectively. The excitation light source unit 12 generates laser light pulsed to have a femtosecond pulse width as the excitation light L01 and L02.

In the scan head 11, the electromagnetic wave generation element emits the pulse waves W1 toward the sample SA, and the electromagnetic wave detection element receives the reflected waves of the pulse waves W1 from the sample SA. The electromagnetic wave detection element generates a signal (detection signal) S1 representing the reflected waves received from the sample SA. The optical measurement apparatus 30 includes a signal processing unit 13 that performs various types of signal processing on the detection signal S1.

The optical measurement apparatus 10 includes a display unit 14 that displays a processing result processed by the signal processing unit 13. In the present embodiment, the signal processing unit 13 generates a tomographic image or the life of the sample SA, which the display unit 14 displays. The optical measurement apparatus 10 also includes a control unit 15 that controls operation of the scan head 11, the excitation light source unit 12, the signal processing unit 13, and the display unit 14.

Next, the scan head 11 will be described with reference to FIG. 2. The scan head 11 includes an electromagnetic wave generation element 20 and an electromagnetic wave detection element 30 inside. The electromagnetic wave generation element 20 is a terahertz wave generation element that is excited by the excitation light L01 and generates terahertz waves as the pulse waves W1. The scan head 11 scans and irradiates the sample SA with the pulse waves W1.

The electromagnetic wave detection element 30 is a terahertz wave detection element that is excited by the excitation light L02 and receives and detects terahertz waves as the electromagnetic waves (may be referred to as reflected waves or reception waves) W2 reflected from the sample SA. The electromagnetic wave detection element 30 functions as the reception unit of the reflected waves W2 in the scan head 11.

In the present embodiment, the scan head 11 includes a condenser lens LZ that condenses the pulse waves W1 and a beam splitter BS that separates the reflected waves W2 from the pulse waves W1 and makes the reflected waves W2 incident on the electromagnetic wave detection element 30.

In the present embodiment, the excitation light source unit 12 also includes an optical delay device (not illustrated) that causes the excitation light L02 to arrive at the electromagnetic wave detection element 30 with a delay. The optical measurement apparatus 10 adjusts the time of arrival of the excitation light L02 at the electromagnetic wave detection element 30 by using the optical delay device, and thereby disperses the terahertz waves that are the reflected waves W2 in a time domain for measurement.

Figure 3:
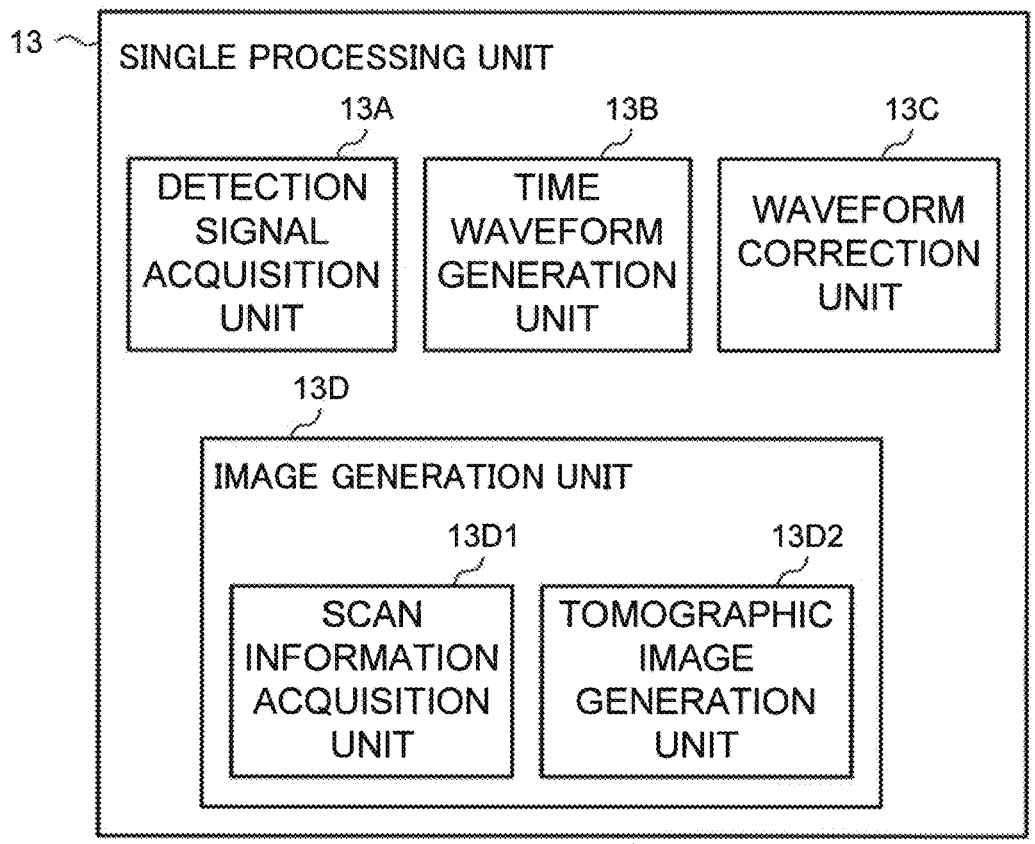
FIG. 3 is a block diagram of a signal processing unit in the optical measurement apparatus according to the first embodiment.

FIG. 3 is a block diagram illustrating a configuration of the signal processing unit 13. In the present embodiment, the signal processing unit 13 includes a detection signal acquisition unit (hereinafter, referred to simply as a signal acquisition unit) 13A that obtains the signal (detection signal) S1 representing the reflected waves W2 corresponding to respective scan positions of the pulse waves W1 by the scan head 11. For example, the signal acquisition unit 13A obtains scan position information about the pulse waves W1 from the control unit 15, and obtains the detection signal S1 of the reflected waves W2 from the electromagnetic wave detection element 30 of the scan head 11.

The signal processing unit 13 also includes a time waveform generation unit (hereinafter, referred to simply as a waveform generation unit) 13B that generates a plurality of time waveforms indicating temporal variations in the detection signal S1 at the respective scan positions. The signal processing unit 13 also includes a time waveform correction unit (hereinafter, referred to simply as a waveform correction unit) 13C that detects at least one peak in each of the plurality of time waveforms generated by the waveform generation unit 13B and corrects each of the time waveforms on the basis of each of the positions of the at least one peak in the time waveforms.

Figure 4:
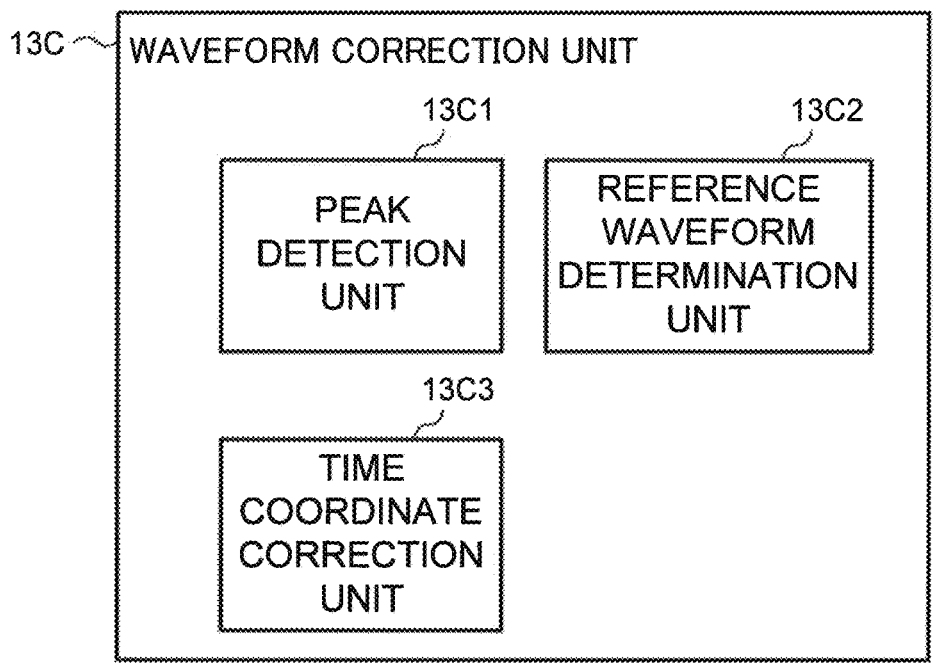
FIG. 4 is a block diagram of a waveform correction unit in the optical measurement apparatus according to the first embodiment.

Now, a configuration of the waveform correction unit 13C will be described with reference to FIG. 4. FIG. 4 is a block diagram of the waveform correction unit 13C. In the present embodiment, the waveform correction unit 13C includes a peak detection unit 13C1 that detects peaks in each of the plurality of time waveforms generated by the waveform generation unit 13B. The peak detection unit 13C1 analyzes each of the time waveforms, and detects the positions (time coordinates) and amplitudes (signal intensities) of the peaks in the waveform.

The waveform correction unit 13C also includes a reference waveform determination unit 13C2 that determines a reference waveform (one time waveform) serving as a reference for correction among the time waveforms. The reference waveform determination unit 13C2 also determines the time waveforms other than the reference waveform as correction waveforms (other time waveforms).

The waveform correction unit 13C also includes a time coordinate correction unit 13C3 chat determines a reference peak serving as a reference for correction among the peaks in each of the time waveforms and corrects the time coordinates of the correction waveforms to align the positions of the reference peaks of the correction waveforms to that of the reference peak of the reference waveform.

Referring to FIG. 3 again, the signal processing unit 13 includes an image generation unit 13D that generates an image (tomographic image) showing a tomographic structure of the sample SA on the basis of the plurality of time waveforms generated by the waveform generation unit 13B and the waveform correction unit 13C.

In the present embodiment, the image generation unit 13D includes a scan information acquisition unit 13D1 that obtains scan information about the pulse waves W1 in each time waveform, and a tomographic image generation unit 13D2 that generates a tomographic image in an irradiation direction (optical axis direction) of the sample SA with the pulse waves W1, i.e., is a direction perpendicular to the mounting surface MS of the mounting table 11T.

For example, the scan information acquisition unit 13D1 obtains information that associates the scan position of the scan head 11 corresponding to each time waveform, i.e., the irradiation position of the pulse waves W1 on the sample SA with the time waveform. The tomographic image generation unit 13D2 generates image data showing a cross section along the scan direction of the sample SA with the pulse waves W1 on the basis of the peaks of the time waveforms generated by the waveform generation unit 13B and the scan positions of the pulse waves W1 corresponding to the time waveforms.

Figure 5:
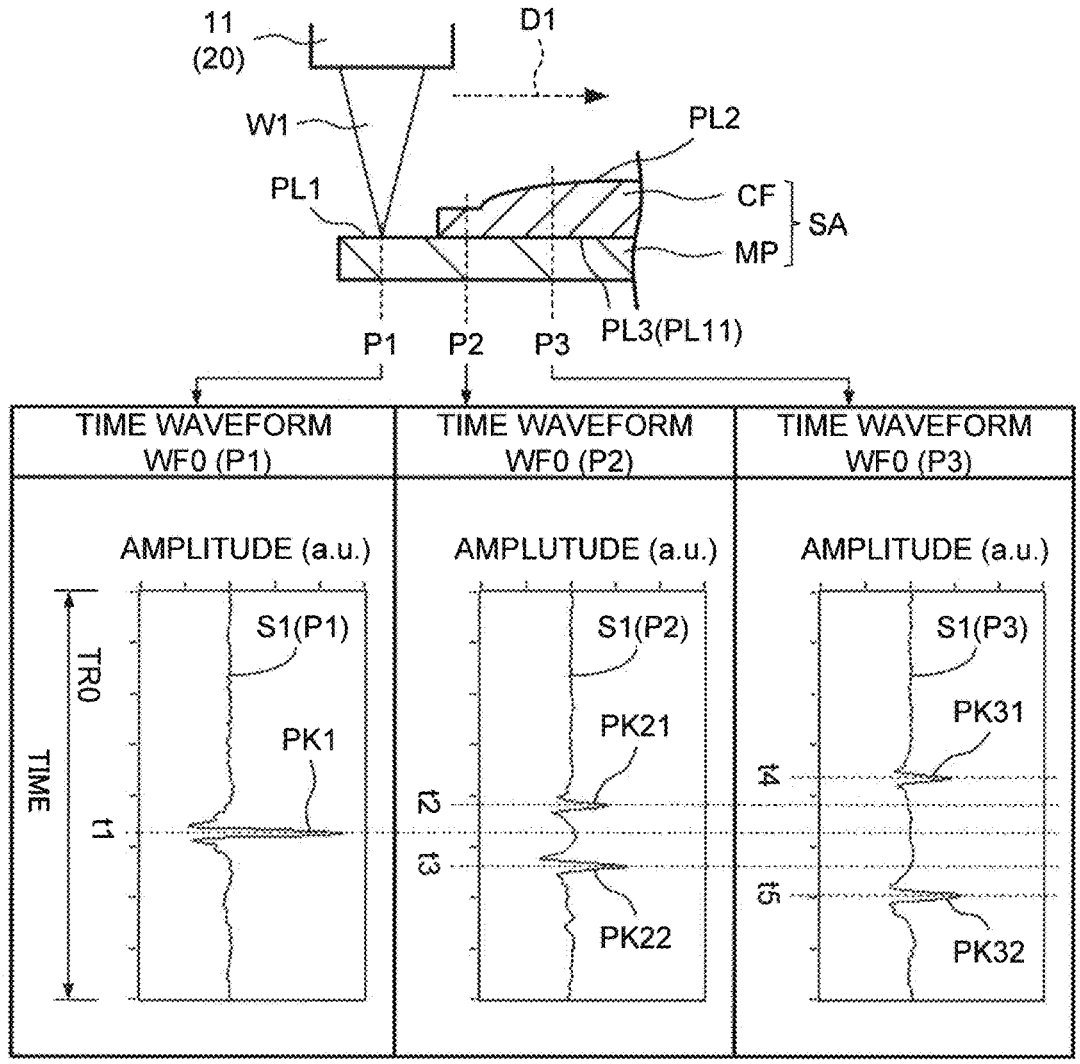
FIG. 5 is a diagram illustrating an example of uncorrected time waveforms generated by the optical measurement apparatus according to the first embodiment.
Figure 6:
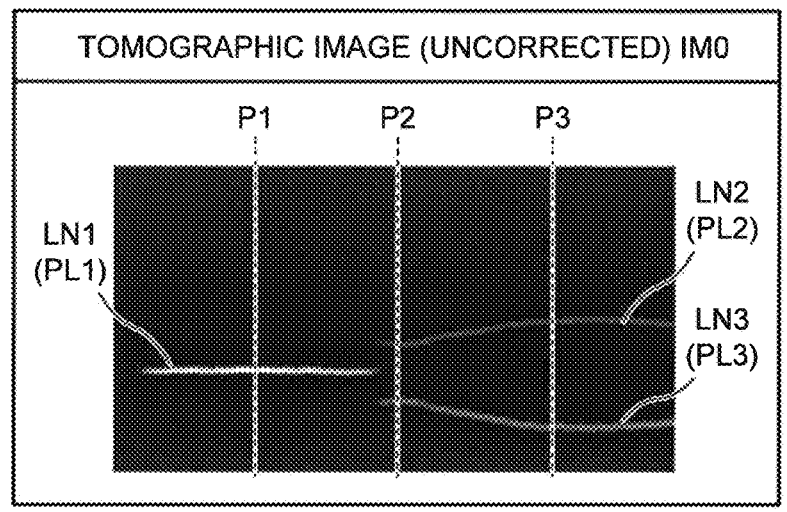
FIG. 6 is a diagram illustrating an example of an uncorrected tomographic image generated by the optical measurement apparatus according to the first embodiment.

Next, an operation example of the waveform generation unit 13B and the image generation unit 13D will be described with reference to FIGS. 5 and 6. FIG. 5 is a diagram illustrating an example of time waveforms WF0 of the sample SA generated by the waveform generation unit 13B. FIG. 6 is a diagram illustrating an example of a tomographic image IM0 of the sample SA generated by the image generation unit 13D on the basis of the time waveforms WF0 illustrated is FIG. 5. FIGS. 5 and 6 are diagrams illustrating the examples of the time waveforms WF0 and the tomographic image IM0 when no waveform correction by the waveform correction unit 13C is performed.

Initially, FIG. 5 illustrates an example of an actual cross section of the sample SA. For example, suppose that the sample SA includes a metal plate MP and a coating film CF formed on the metal plate MP. An operation example of the waveform generation unit 13B and the image generation unit 13D in a case where the sample SA has the shape illustrated in FIG. 5 in a direction along the scan line of the scan head 11 (scan direction D1) will be described.

For example, a portion on a top surface PL1 of the metal plate MP where no coating film CF is formed will be referred to as a first scan position P1. A portion where the coating film CF has a relatively small thickness will be referred to as a second scan position P2. A portion where the coating film CF has a relatively large thickness will be referred to as a third scan position P3.

At the first scan position P1, the reflected waves W2 include a terahertz wave pulse reflected from the top surface PL1 of the metal plate MP. The waveform generation unit 13B thus generates a waveform having a peak PK1 at a time coordinate (temporal position) t1 corresponding to the top surface PL1 of the metal plate MP as a time waveform WF0(P1) of the detection signal S1(P1) at the first, scan position P1.

By contrast, at the second and third scan positions P2 and P3, the reflected waves W2 include a terahertz wave pulse reflected from a surface (top surface) PL2 of the coating film CF and a terahertz wave pulse reflected from an interface PL3 between the metal plate MP and the coating film CF (i.e., a portion PL11 of the top surface PL1 of the metal plate MP, covered with the coating film CF).

As a time waveform WF0(P2) of the detection signal S1(P2) at the second scan position P2, the waveform generation unit 12B thus generates a waveform having both a peak PK21 at a time coordinate (temporal position) t2 corresponding to the surface PL2 of the coating film CF and a peak PK22 at a time coordinate t3 corresponding to the interface PL3 between the metal plate MP and the coating film CF.

Similarly, as a temporary waveform WF0(P3) of the detection signal S1(P3) at the third scan position P3, the waveform generation unit 13B generates a waveform having both a peak PK31 at a time coordinate (temporal position) t4 corresponding to the surface PL2 of the coating film CF and a peak PK32 at a time coordinate t5 corresponding to the interface PL3 between the metal plate MP and the coating film CF.

In such a manner, the waveform generation unit 13B generates a plurality of time waveforms WF0 indicating temporal variations in the detection signal S1 at a plurality of scan positions (for example, scan positions P1 to P3) of the pulse waves W1 on the sample SA. For example, the waveform generation unit 13B sets a predetermined time region TR0 as a data region for time waveforms WF0 and generates waveforms in the lime region TR0.

FIG. 6 is a diagram illustrating the tomographic image IM0 generated by the image generation unit 13D on the basis of the time waveforms WF0. The left line LN1 in the tomographic image IM0 is a line corresponding to the exposed top surface PL1 of the metal plate MP. The upper right line LN2 is a line corresponding to the top surface PL2 of the coating film CF. The lower right, line LN3 is a line corresponding to the interface PL3 between the metal plate MP and the coating film CF.

That the peak positions PK1, PK22, and PK32 are ones corresponding to the top surface PL1 (PL11) of the metal plate MP, i.e., the same surface can be determined, for example, on the basis of the numbers of peaks in the time waveforms WF0(P1) to WF0(P3), the positions (time coordinates) of the respective peaks, the amplitudes at the peak positions, etc.

For example, the image generation unit 13D determines the peaks having the largest (latest) time coordinates in the respective time waveforms WF0(P1) to WF0(P3) as ones corresponding to the same surface. Alternatively, for example, peaks detected in a predetermined time region may be determined as ones corresponding to the same surface. Peaks having an amplitude exceeding a predetermined threshold may be determined as ones corresponding to the same surface. Peaks corresponding to the same surface may be determined by using such a plurality of determination conditions.

As illustrated in FIG. 6, if the tomographic image IM0 is generated on the basis of the time waveforms WF0 generated by the waveform generation unit 13B, i.e., the time waveforms to which the correction processing by the waveform correction unit 130 is not applied (uncorrected), the top surface PL1 of the metal place MP, which actually is flat, is displayed in a curved shape. The reason is that the terahertz waves at the first to third scan positions P1 to P3 have respective different optical lengths from the emission of the pulse waves W1 from the electromagnetic wave generation element 20 to the detection of the reflected waves W2 by the electromagnetic wave detection element 30.

Specifically, at the first scan position P1, the reflected waves W2 reflected from the top surface PL1 of the metal plate MP are detected without passing through media other than the air. By contrast, at the second scan positions P2 and P3, the reflected waves W2 reflected from the interlace PL3 between the metal plate MP and the coating film CF are detected after transmission (reciprocation) through the coating film CF. The reflected waves W2 thus vary in the time of arrival at the electromagnetic wave detection element 30 (in the present embodiment, the time of arrival is delayed) as much as transmitted through the coating film CF due to the refractive index of the coating film CF.

For example, as illustrated in FIG. 5, the positions t3 and t5 of the peaks PK22 and PK32 corresponding to the interface PL3 between the metal plate MP and the coating film CF in the time waveforms WF0(P2) and WF0(P3) corresponding to the second and third scan positions P2 and P3 therefore deviate from the position t1 of the peak PK1 in the time waveform WF0 (F1) at the first scan position P1. The actually-flat surface PL1 is thereby displayed in a curved shape. If a tomographic image of the sample SA is generated by the time-of-flight method, an image showing a cross-sectional structure different from the actual one can thus be generated like the tomographic image IM0.

Figure 7:
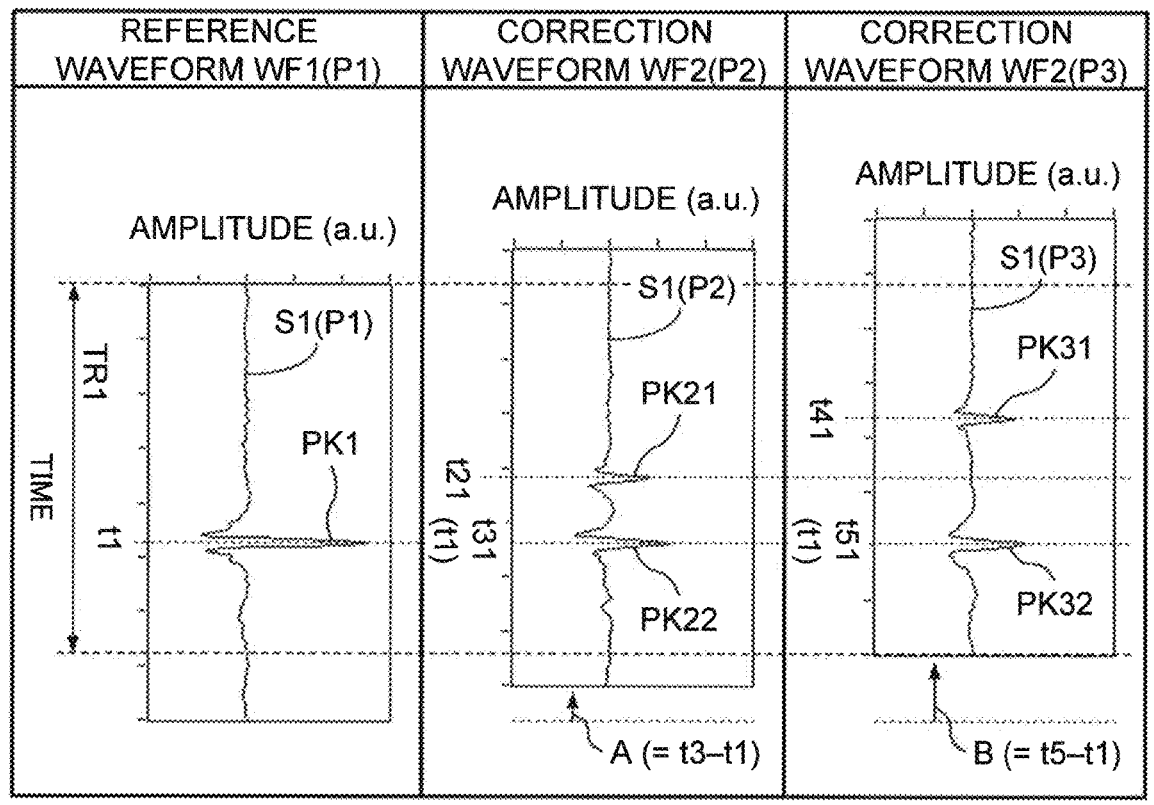
FIG. 7 is a diagram illustrating an example of corrected time waveforms generated by the optical measurement apparatus according to the first embodiment.
Figure 8:
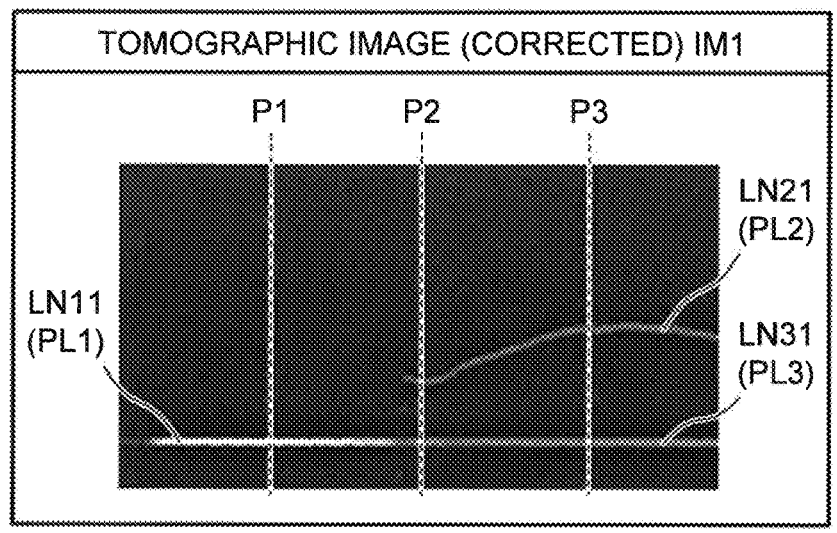
FIG. 8 is a diagram illustrating an example of a corrected tomographic image generated by the optical measurement apparatus according to the first embodiment.

Next, an operation of the waveform correction unit 13C and the image generation unit 13D based thereon will be described with reference to FIGS. 7 and 8. FIG. 7 is a diagram illustrating (corrected) time waveforms WF1 and WF2 generated by the waveform correction unit 13C. FIG. 8 is a diagram illustrating a tomographic image IM1 of the sample SA generated on the basis of the corrected time waveforms WF1 and WF2.

Initially, as illustrated in FIG. 7, the waveform correction unit 13C determines a reference waveform (one time waveform) WF1 serving as a reference for correction and correction waveforms (other time waveforms) WF2 to be corrected among the time waveforms WF0 by using the reference waveform determination unit 13C2.

The time coordinate correction unit 13C3 of the waveform correction unit 13C determines a reference peak in each of the time waveforms WF0 on the basis of the positions, amplitudes, and number of peaks in each of the time waveforms WF0. The reference peak in each time waveform WF0 can be determined in consideration of various conditions, such as that the peak falls within a predetermined range of time coordinates, that the peak has an amplitude greater than or equal to a predetermined threshold, and/or that the peak comes after a predetermined number of peaks among a plurality of peaks in the same waveform.

The time coordinate correction unit 13C3 corrects the time coordinates of the correction waveforms WF2 to align the positions of the reference peaks in the correction waveforms WF2 to that of the reference peak in the reference waveform WF1. For example, the time coordinate correction unit 13C3 generates new time waveforms where the time coordinates of the respective reference peaks are aligned.

In the present embodiment, the peak detection unit 13C1 of the waveform correction unit 13C detects the peaks PK1 to PK32 of the time waveforms WF0. The reference waveform determination unit 13C2 determines the time waveform WF0(P1) at the first scan position P1 as the reference waveform WF1, and determines the time waveforms WF0(P2) and WF0(P3) at the second and third scan positions P2 and P3 as the correction waveforms WF2.

The time coordinate correction unit 13C3 also determines (selects) the peak PK1 of the time waveform WF0(P1), the peak PK22 of the time waveform WF0(P2), and the peak PK32 of the time waveform WF0(P3) as the reference peaks serving as references for correction. The time coordinate correction unit 13C3 also corrects the time coordinates of the correction waveforms WF2 to align the positions of the peaks PK22 and PK32 that are the reference peaks of the correction waveforms WF2 to that of the reference peak PK1 in the reference waveform WF1.

As illustrated in FIG. 7, the time coordinate correction unit 13C3 corrects the time coordinates of the correction waveforms WF2(P2) and WF2(P3) to align the positions of the reference peaks PK22 and FK32 in the correction waveforms WF2 to that, of the reference peak PK1 in the reference waveform WF1. Initially, the time coordinate of the peak PK22 in the correction waveform WF2(P2) is thereby moved (shifted) from the coordinate t3 to a coordinate t31 that is the same coordinate as the coordinate t1. In the present embodiment, the entire correction waveform WF2(P2) is offset as much as a difference A between the coordinates t3 and t1.

Similarly, the time coordinate of the peak PK32 in the correction waveform WF2(P3) is shifted from the coordinate t5 to a coordinate t51 that is the same coordinate as the coordinate t1. The entire correction waveform WF2(P3) is offset as much as a difference D between the coordinates t5 and t1.

Alternatively, the time coordinate correction unit 13C3 may detect time waveforms WF0 including no reference peak (i.e., peak corresponding to the same surface of the sample SA) among the time waveforms WF0, for example, on the basis of peak positions, amplitudes, etc. Such time waveforms can be excluded from correction.

Alternatively, fox example, the reference waveform WF1, the correction waveforms WF2, and the reference peaks of the respective time waveforms may be specified by an operator who observes the uncorrected tomographic image IM0. In other words, for example, the reference waveform WF1 may be determined by the reference waveform determination unit 13C2 or specified from outside.

For example, the reference waveform determination unit 13C2 may determine an arbitrary one of the time waveforms WF0 as the reference waveform WF1. The reference waveform determination unit 13C2 may determine a time waveform WF0 including a peak having the smallest (earliest) time coordinate among the reference peaks corresponding to the same surface, as the reference waveform WF1.

FIG. 8 is a diagram illustrating the tomographic image IM1 generated on the basis of the corrected time waveforms WF1 and WF2. As illustrated in FIG. 8, for example, lines LN11 and LN31 representing the top surface PL1 of the metal plate MP and the interface PL3 between the metal plate MP and the coating film CF, which are the same surface, are displayed in a flat shape. It can be seen that an image close to the actual cross-sectional structure is obtained.

In the present embodiment, the time coordinates of the correction waveforms WF2 are described to be offset. In other words, the waveform correction unit 13C is described to make corrections by only shifting the time coordinates without adjusting the shape of the correction waveforms WF2. Such corrections made by the waveform correction unit 13C significantly improve the accuracy of the tomographic image as illustrated in FIGS. 6 and 8.

The same surface of the sample SA corresponding to the reference peaks is displayed in a flat shape by aligning the positions of the reference peaks in the respective time waveforms. As a result, the same surface is displayed in a flat shape, for example, even if the mounting table 11T is oblique to the scan head 11. This eliminates the need for strict positioning, for example, between the mounting table 11T, i.e., the sample SA and the scan head 11. Complicated mechanisms for performing the strict positioning are not needed, either. That is, an accurate tomographic image can be easily obtained by providing the signal processing unit 13 with the waveform-correcting section (circuit).

However, the configuration of the waveform correction unit 13C is not limited thereto. For example, the waveform correction unit 13C may be configured to fine adjust the peak positions in the waveforms after the correction of the time coordinates. For example, the waveform correction unit 13C may calculate the refractive indexes of the layers (for example, the metal plate MP and the coating film CF) of the sample SA, and adjust the amounts of shift in the time coordinates of the respective peaks on the basis of the refractive indexes and the distance between the peaks in the waveforms (for example, between the peaks PK21 and PK22 in FIG. 5). This enables more accurate generation and display of a tomographic image, so that the cross-sectional structure of the sample SA can be found out more accurately.

Note that the offsetting of the time coordinates produces a region (time region TR1) where all the time coordinates overlap and a region where time coordinates are partly missing in the corrected time waveforms WF1 and WF2.

For example, the time coordinate correction unit 13C3 may set the time region TR1 where the time coordinates of all the time waveforms WF1 and WF2 overlap as the data region of the corrected time waveforms WF1 and WF2, and delete the other missing regions. Alternatively, the time coordinate correction unit 13C3 may provide new time coordinates for the time waveforms WF1 and WF2 to fill the non-overlapping time region. The time coordinate correction unit 13C3 may apply the waveforms on the offset, protruding time coordinates to the new time coordinates.

Figure 9:
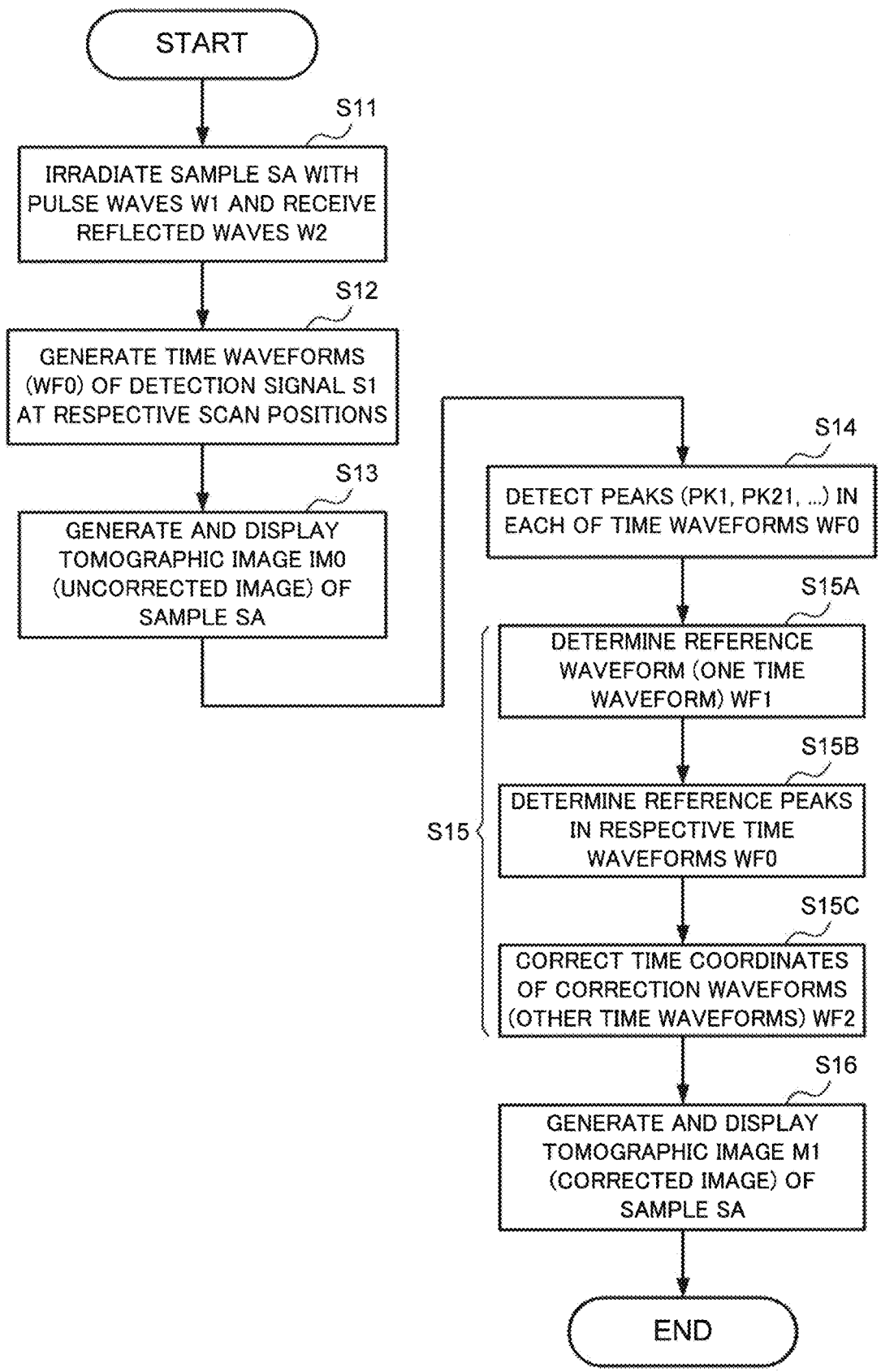
FIG. 9 is a diagram illustrating an operation flow of the optical measurement apparatus according to the first embodiment.

FIG. 9 is a diagram illustrating an example of a measurement operation flow by the optical measurement apparatus 10. The optical measurement apparatus 10 operates in accordance with the flow illustrated in FIG. 9, for example. Initially, the scan head 11 (irradiation unit) irradiates the surface of the sample SA with the pulse waves W1 in a scanning manner. The scan head 11 (reception unit) also receives the reflected waves W2 from the scanned positions of the sample SA (step S11). The electromagnetic wave detection element 30 in the scan head 11 generates the detection signal S1 indicating the reflected waves W2. The signal acquisition unit 13A of the signal processing unit 13 obtains the detection signal S1 representing the reflected waves W2 from the sample SA.

The waveform generation unit 13B then generates time waveforms WF0 indicating temporal variations in the detection signal S1 at the respective scan positions (for example, scar, positions P1 to P3) of the pulse waves W1 (step S12). Next, the image generation unit 13D generates a tomographic image IM0 of the sample SA on the basis of the time waveforms WF0. The display unit 14 displays the tomographic image IM0 (step S13).

The waveform correction unit 13C then detects the peaks in each of the time waveforms WF0 by using the peak detection unit 13C1 (step S14). The waveform correction unit 13C also corrects each of the time waveforms WF0 on the basis of the positions of the peaks in each of the time waveforms WF0 (step S15).

In the present embodiment, the reference waveform determination unit 13C2 initially determines the reference waveform WF1 serving as a reference for correction (step S15A). Next, the time coordinate correction unit 13C3 determines the reference peaks in the respective time waveforms WF0 (step S15B). The time coordinate correction unit 13C3 then corrects the time coordinates of the correction waveforms WF2 to align the reference peaks of the correction waveforms WF2 to the reference peak of the reference waveform WF1 (step S15C).

The image generation unit 13D generates a tomographic image XM1 of the sample SA on the basis of the time waveforms WF1 and WF2 corrected by the waveform correction unit 13C. The display unit 14 displays the tomographic image IM1 (step S16).

In the present embodiment, the optical measurement apparatus 10 is described to include the excitation light source unit 12, the display unit 14, and the control unit 15. However, the optical measurement apparatus 10 does not need to include the excitation light source unit 11, the display unit 14, and the control unit 15. In the present embodiment, the optical measurement apparatus 10 is also described to include the mounting table 11T for the sample SA. However, the optical measurement apparatus 10 does not need to include the mounting table 11T. Moreover, the configuration of the signal processing unit 13 and the waveform correction unit 13C is just an example.

In the present embodiment, the optical measurement apparatus 10 is also described to include the scan head 11 including the electromagnetic wave generation element 20 and the electromagnetic wave detection element 30. However, the optical measurement apparatus 10 may include, for example, an irradiation unit that scans and irradiates the sample SA with the pulse waves W1 and a reception unit that receives the reflected waves W2 from the sample SA. For example, the electromagnetic wave generation element 20 and the electromagnetic wave detection element 30 do not need to be built in the scan head 11. For example, the scan head 11 may include an emission unit of the pulse waves W1 and a reception unit of the reflected waves W2.

The present embodiment has also dealt with the case where the cross-sectional structure of the sample SA is analyzed by measuring terahertz waves as the pulse waves W1 and the reflected waves W2. However, the optical measurement apparatus 10 may be configured to emit and measure pulsed electromagnetic waves and thereby analyze the sample SA. For example, if electromagnetic waves other than terahertz waves, such as infrared rays, are used, the excitation light source unit 11 does not need to be provided.

In the present embodiment, the tomographic image generation unit 13D2 is described to generate a tomographic image in the direction perpendicular to the mounting surface MS of the mounting table 11T for the sample SA. However, the tomographic image generation unit 13D2 may generate not only a tomographic image of the sample SA in the direction perpendicular to the mounting surface MS but a tomographic image in a direction parallel to the mounting surface MS as well.

For example, the optical measurement apparatus 10 may be configured so that the scan head 11 scans the pulse waves W1 two-dimensionally in the in-plane directions of the mounting surface MS. For example, the tomographic image generation unit 13D2 may generate image date showing a cross section of the sample SA in a direction parallel to the mounting surface MS depending on the distance from the mounting surface MS. The tomographic image generation unit 13D2 may not only generate an image showing a cross section of the sample SA (in other words, an internal image of the sample SA) but also generate image data showing the surface of the sample SA, such as the surface of the sample SA on the scan head 11 side or the surface of the sample SA on the mounting table 11T side.

As described above, in the present embodiment, the optical measurement apparatus 10 includes the irradiation unit (scan head 11) that scans and irradiates the sample SA with the pulse waves W1, the reception unit (electromagnetic wave detection element 30) that receives the reflected waves W2 of the pulse waves W1 from the sample SA, and the waveform generation unit 13B that generates the time waveforms WF0 of the signal S1 representing the reflected waves W2 at the respective scan positions P1 to P3.

The optical measurement apparatus 10 also includes the waveform correction unit 13C that detects at least one peak in each of the time waveforms WF0 and corrects each of the time waveforms WF0 on the basis of the positions of the peaks in each of the time waveforms WF0. An optical measurement apparatus 10 that can perform appropriate processing on the time waveforms WF0 of the electromagnetic waves from the sample SA at the respective scan positions P1 to P3 to accurately and clearly find out the cross-sectional configuration of the sample SA can thus be provided.

The present invention can also be implemented as an optical measurement method using the pulse waves W1 through the procedure illustrated in FIG. 9, for example.

Specifically, for example, the measurement method according to the present invention includes the steps of: scanning and irradiating the sample SA with the pulse waves W1 (step S11); receiving the reflected waves W2 of the pulse waves W1 from the sample SA (step S11); generating temporary waveforms WF0 of the signal S1 of the reflected waves W2 at the respective scan positions P1 to P3 (step S12); and detecting at least one peak in each of the plurality of time waveforms WF0 (step S14), and correcting each of the time waveforms WF0 on the basis of the positions of the peaks in each of the time waveforms WF0 (step S15).

A measurement method that is capable of performing appropriate processing on the time waveforms WF0 of the electromagnetic waves from the sample SA at the respective scan positions P1 to P3 to accurately and clearly find out the cross-sectional structure of the sample SA can thus be provided.

The present invention can also be implemented as a program for causing an optical measurement apparatus to preform the operation flow illustrated in FIG. 9, for example.

Specifically, for example, the program according to the present invention causes an optical measurement apparatus to include the irradiation unit (scan head 11) that scans and irradiates the sample SA with the pulse waves W1, the reception unit (electromagnetic wave detection element 30) that receives the reflected waves W2 of the pulse waves W1 from the sample SA, and the waveform generation unit 13B that generates time waveforms WF0 of the signal S1 representing the reflected waves W2 at the respective scan positions P1 to P3.

The program according to the present invention also causes operation as the waveform correction unit 13C that detects at least one peak in each of the plurality of time waveforms WF0 and corrects each of the time waveforms WF0 on the basis of the positions of the peaks in each of the time waveforms WF0.

The present invention can also be implemented as a recording medium on which the foregoing program is recorded. A program and a recording medium capable of performing appropriate processing on the time waveforms WF0 of the electromagnetic waves from the sample SA at the respective scan positions P1 to P3 to accurately and clearly find out the cross-sectional structure of the sample SA can thus be provided.

REFERENCE SIGNS LIST 10 optical measurement apparatus
11 scan head (irradiation unit)
13 signal processing unit
13B waveform generation unit
13C waveform correction unit
13C4 time coordinate correction unit

The invention claimed is:
1. An optical measurement apparatus comprising:
a mounting surface configured to receive a sample mounted thereon;
a light source configured to emit pulse waves along an optical axis substantially perpendicular to the mounting surface;
a detector configured to receive reflected waves of the pulse waves from said sample;
a storage medium configured to store a program; and
a signal processor communicably coupled to the storage medium, the signal processor configured to execute the program to:

change a position, relative to the optical axis, of the sample mounted on the mounting surface through the plurality of irradiation positions along a direction parallel to the mounting surface, for each of the plurality of irradiation positions along the direction parallel to the mounting surface, control the light source to irradiate the sample at each respective irradiation position along the direction parallel to the mounting surface;

receive, using the detector, reflected waves of the pulse waves from the sample at each respective irradiation position along the direction parallel to the mounting surface, and generate a time waveform of a signal representing the reflected waves at each respective irradiation position along the direction parallel to the mounting surface;

detect at least one peak in each of the time waveforms; and correct each of the time waveforms based on each of positions of the detected at least one peak in the time waveforms of each of the irradiation positions along the direction parallel to the mounting surface.

2. The optical measurement apparatus according to claim 1, wherein the signal processor is further configured to:

determine one time waveform serving as a reference for correction among the time waveforms; and determine a reference peak as a reference for correction from the at least one peak in each of the time waveforms, and correct time coordinates of the other time waveforms to align the position of the reference peak of each of the other time waveforms with that of the reference peak in the one time waveform.

3. The optical measurement apparatus according to claim 2, wherein the signal processor ins configured to determine the reference peak on a basis of the position and an amplitude of the at least one peak and a number of the at least one peak in each of the time waveforms.

4. The optical measurement apparatus according to claim 1, wherein the signal processor is configured to generate a tomographic image of the sample on a basis of the corrected time waveforms.

5. A measurement method for an optimal measurement apparatus comprising the steps of:

changing a position of a sample mounted on a mounting surface, relative to an optical axis substantially perpendicular to the mounting surface, through a plurality of irradiation positions along a direction parallel to the mounting surface, for each of the plurality of irradiation positions along the direction parallel to the mounting surface, control a light source to irradiate the sample mounted on a mounting surface with pulse waves emitted along the optical axis substantially perpendicular to the mounting surface at each respective irradiation position along the direction parallel to the mounting surface, receiving reflected waves of the pulse waves from the sample at each respective irradiation position along the direction parallel to the mounting surface, and generating a time waveform of a signal representing the reflected waves at each respective irradiation position along the direction parallel to the mounting surface;

detecting at least one peak in each of the time waveforms; and correcting each the time waveforms based on each of positions of the detected at least one peak in the time waveforms of each the irradiation positions of the detector at least one peak in time waveforms of each the irradiation positions along the direction parallel to the mounting surface.

6. A non-transitory computer-readable storage medium storing a program for causing an optical measurement apparatus to execute the steps of:

changing a position of a sample mounted on a mounting surface, relative to an optical axis substantially perpendicular to the mounting surface, through a plurality of irradiation positions along a direction parallel to the mounting surface, for each of the plurality of irradiation positions along the direction parallel to the mounting surface, control a light source to irradiate the sample mounted on a mounting surface with pulse waves emitted along the optical axis substantially perpendicular to the mounting surface at each respective irradiation positions along the direction parallel to the mounting surface, receiving reflected waves of the pulse waves from the sample at each respective irradiation position along the direction parallel to the mounting surface, and generating a time waveform of a signal representing the reflected waves at each respective irradiation position along the direction parallel to the mounting surface;

detecting at least one peak in each of the time waveforms; and correcting each the time waveforms based on each of positions of the detected at least one peak in the time waveforms of each the irradiation positions along the direction parallel to the mounting surface.

* * * * *